US012697942B2

(12) United States Patent
Lee et al.

(10) Patent No.: US 12,697,942 B2
(45) Date of Patent: Aug. 4, 2026

(54) VEHICLE SENSOR CLEANING APPARATUS AND CONTROL METHOD THEREOF

(71) Applicants: DY AUTO CORPORATION, Chungcheongnam-do (KR); DY-ESSYS CORP., Incheon (KR)

(72) Inventors: Jong Wook Lee, Chungcheongnam-do (KR); Sin Won Kang, Chungcheongnam-do (KR); Min Wook Park, Incheon (KR); Sun Ju Kim, Incheon (KR); Hyeong Jun Kim, Incheon (KR)

(73) Assignees: DY AUTO CORPORATION (KR); DY-ESSYS CORP. (KR)

( * ) Notice: Subject to any disclaimer, the term of this patent is extended or adjusted under 35 U.S.C. 154(b) by 50 days.

(21) Appl. No.: 18/584,441

(22) Filed: Feb. 22, 2024

(65) Prior Publication Data

US 2024/0286585 A1 Aug. 29, 2024

(30) Foreign Application Priority Data

Feb. 23, 2023 (KR) ........................ 10-2023-0024582

(51) Int. Cl.
B60S 1/56 (2006.01)
B60R 16/023 (2006.01)
B60S 1/52 (2006.01)
B60S 1/54 (2006.01)

(52) U.S. Cl.
CPC ............ B60S 1/56 (2013.01); B60R 16/0231 (2013.01); B60S 1/52 (2013.01); B60S 1/54 (2013.01)

(58) Field of Classification Search
CPC ...... B60S 1/56; B60S 1/52; B60S 1/54; B60S 1/481; B60R 16/0231
See application file for complete search history.

(56) References Cited

U.S. PATENT DOCUMENTS

| | | | | |
|---|---|---|---|---|
| 9,505,382 | B2 * | 11/2016 | Gokan | .................. B60S 1/0848 |
| 9,796,361 | B2 * | 10/2017 | Gokan | ...................... B60S 1/56 |
| 10,011,251 | B2 * | 7/2018 | Gokan | .................. G03B 17/02 |
| 10,220,817 | B2 * | 3/2019 | Rice | .......................... B60S 1/56 |
| 10,569,746 | B2 * | 2/2020 | Schmidt | .................. G01S 17/86 |
| 10,723,325 | B2 * | 7/2020 | Rice | .......................... B08B 3/02 |
| 10,766,464 | B2 * | 9/2020 | Schmidt | .................... B60S 1/62 |

(Continued)

FOREIGN PATENT DOCUMENTS

| | | |
|---|---|---|
| JP | 2005-186855 A | 6/1998 |
| JP | 2002-362322 A | 12/2002 |

(Continued)

*Primary Examiner* — Alexander Markoff
(74) *Attorney, Agent, or Firm* — Klarquist Sparkman, LLP

(57) ABSTRACT

A vehicle sensor cleaning apparatus and a control method of the vehicle sensor cleaning apparatus are disclosed. The vehicle sensor cleaning apparatus includes a liquid sprayer configured to spray washer fluid at at least one sensor located in a vehicle through a motor drive, an air sprayer configured to spray air at the at least one sensor, a liquid controller configured to control washer fluid spraying by the liquid sprayer according to a cleaning request signal received from a vehicle controller, and an air controller configured to control air spraying by the air sprayer according to a cleaning request signal received from the vehicle controller.

13 Claims, 15 Drawing Sheets

(56) References Cited

U.S. PATENT DOCUMENTS

| | | | | |
|---|---|---|---|---|
| 11,433,858 | B2 * | 9/2022 | Fiebrandt | B60S 1/481 |
| 11,667,268 | B2 * | 6/2023 | Kawamura | B60S 1/485 |
| | | | | 134/57 R |
| 12,246,684 | B2 * | 3/2025 | Nagai | B60S 1/48 |
| 2009/0250533 | A1 * | 10/2009 | Akiyama | B60S 1/381 |
| | | | | 239/284.1 |
| 2016/0272165 | A1 * | 9/2016 | Hsiao | G02B 27/0006 |
| 2017/0259788 | A1 * | 9/2017 | Villa-Real | B08B 3/02 |
| 2019/0106085 | A1 * | 4/2019 | Bacchus | G02B 27/0006 |
| 2019/0193688 | A1 * | 6/2019 | Lombrozo | B60S 1/54 |
| 2020/0207312 | A1 * | 7/2020 | Kamiya | B60S 1/56 |
| 2021/0001819 | A1 * | 1/2021 | Kawamura | B08B 3/02 |
| 2022/0063568 | A1 * | 3/2022 | Gilbertson | B08B 5/02 |
| 2022/0097658 | A1 * | 3/2022 | Nagai | B60S 1/46 |
| 2022/0362788 | A1 | 11/2022 | Leidefeldt | |
| 2023/0104642 | A1 * | 4/2023 | Cohrs | B60S 1/481 |
| | | | | 134/58 R |

FOREIGN PATENT DOCUMENTS

| | | | | | |
|---|---|---|---|---|---|
| JP | 2005-295605 | A | 1/2011 | | |
| JP | 2015-214317 | A | 6/2018 | | |
| JP | 2018-116159 | A | 7/2018 | | |
| JP | 2019-104365 | A | 12/2021 | | |
| KR | 1998-0078682 | A | 11/1996 | | |
| KR | 1998-0019848 | A | 6/1998 | | |
| KR | 10-2004-0026491 | A | 3/2004 | | |
| KR | 10-2019-0133241 | A | 4/2020 | | |
| KR | 10-2020-0050153 | A | 5/2020 | | |
| WO | WO-2019022038 | A1 * | 1/2019 | | B60S 1/56 |
| WO | WO-2020162085 | A1 * | 8/2020 | | B60S 1/56 |

* cited by examiner

START

DETERMINE DUTY CYCLE
ACCORDING TO TYPE OF SENSOR —— S900

OUTPUT MOTOR CONTROL SIGNAL
HAVING IDENTIFIED DUTY CYCLE —— S910

CONTROL NOZZLE TO BE IN OFF
STATE WHEN CYCLE OF MOTOR —— S920
CONTROL SIGNAL IS COMPLETED

END

VEHICLE SENSOR CLEANING APPARATUS AND CONTROL METHOD THEREOF

CROSS-REFERENCE TO RELATED APPLICATION

This application is based on and claims priority under 35 U.S.C. § 119 to Korean Patent Application No. 10-2023-0024582, filed on Feb. 23, 2023, in the Korean Intellectual Property Office, the disclosure of which is incorporated by reference herein in its entirety.

BACKGROUND

1. Field

The disclosure relates to a vehicle sensor cleaning apparatus for cleaning a sensor installed on a vehicle and a control method thereof.

2. Description of the Related Art

Recent vehicles include various types of sensors (cameras, radars, LiDars, etc.) A vehicle sensor may not work normally when a foreign object is on a surface of the vehicle sensor. When the sensors necessary for autonomous driving or various driving assistance do not work normally, this can also affect the safety of vehicle operation. Although a system that emits washer fluid to remove foreign substances off a vehicle windshield has been used, it is difficult to employ the washer fluid emitting system to clean small sensors located in various parts of a vehicle.

SUMMARY

The disclosure provides a vehicle sensor cleaning apparatus for removing foreign materials on a surface of a sensor included in a vehicle and a control method of the vehicle sensor clearing apparatus.

Additional aspects will be set forth in part in the description which follows and, in part, will be apparent from the description, or may be learned by practice of the presented embodiments of the disclosure.

According to an embodiment, a vehicle sensor cleaning apparatus includes a liquid sprayer configured to spray washer fluid at at least one sensor located in a vehicle through a motor drive, an air sprayer configured to spray air at the at least one sensor, a liquid controller configured to control washer fluid spraying by the liquid sprayer according to a cleaning request signal received from a vehicle controller, and an air controller configured to control air spraying by the air sprayer according to a cleaning request signal received from the vehicle controller.

According to an embodiment, a control method of a vehicle sensor cleaning apparatus includes receiving a cleaning request signal, and controlling washer fluid spraying and air spraying to be alternately performed on at least one sensor located in a vehicle.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
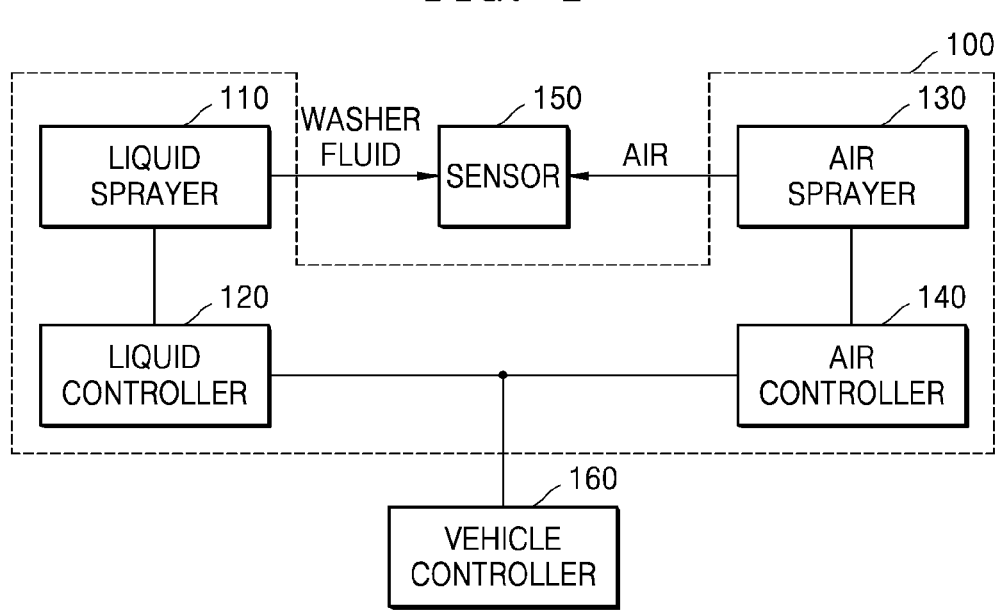
FIG. 1 is a view illustrating an example of an overall structure of a vehicle sensor cleaning apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a vehicle sensor cleaning apparatus and a control method of the vehicle sensor cleaning apparatus, according to an embodiment, will be described in detail with reference to the accompanying drawings.

FIG. 1 is a view illustrating an example of an overall structure of a vehicle sensor cleaning apparatus according to an embodiment.

Referring to FIG. 1, a vehicle sensor cleaning apparatus 100 may include a liquid sprayer 110, a liquid controller 120, an air sprayer 130, and an air controller 140. The vehicle sensor cleaning apparatus 100 may be connected to a vehicle controller 160. In some embodiments, the vehicle sensor cleaning apparatus 100 may further include a gateway (not shown) that transmits a cleaning request of the vehicle controller 160 to each of the liquid controller 120 and the air controller 140. Each of the liquid controller 120 and the air controller 140 may be implemented with a micro controller unit (MCU) or the like.

The liquid sprayer 110 may spray washer fluid on a sensor 150. The washer fluid may include various components according to an embodiment. For example, the washer fluid may include various components such as general water or components identical to those used in a vehicle glass.

Figure 3:
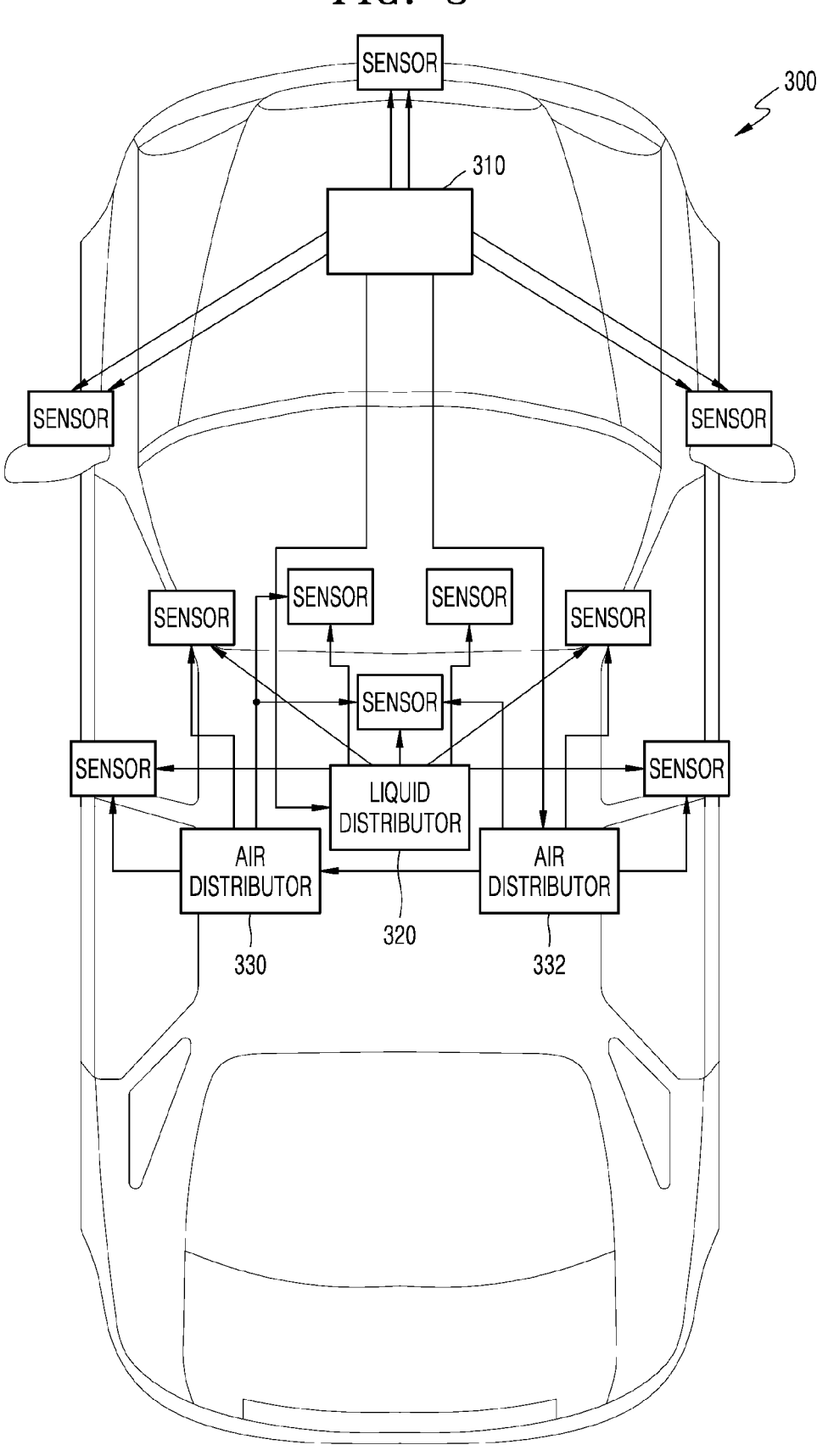
FIG. 3 is a view illustrating an example of a vehicle in which a vehicle sensor cleaning apparatus is implemented, according to an embodiment.
Figure 6:
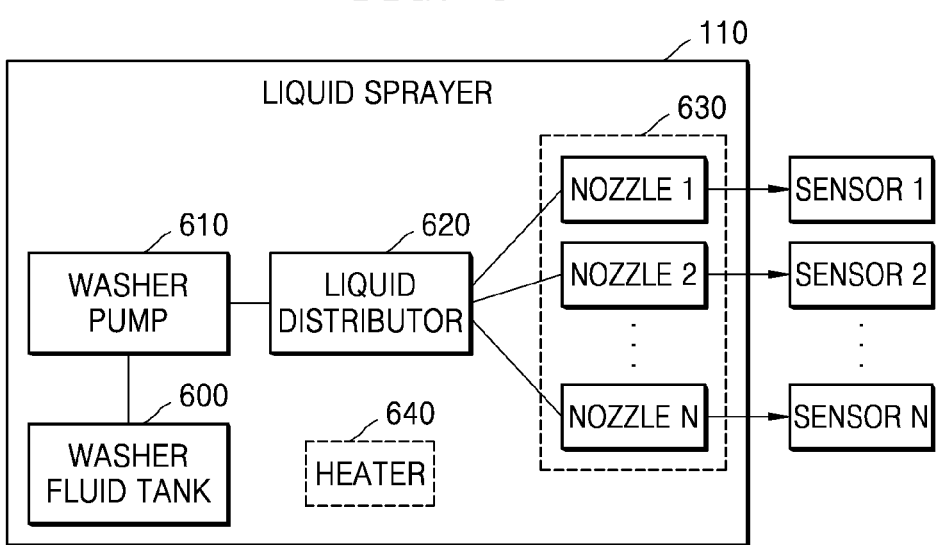
FIG. 6 is a view illustrating an example of a detailed structure of a liquid sprayer, according to an embodiment.

The present embodiment shows only one sensor 150 for convenience of explanation, but a vehicle may include a plurality of sensors as shown in FIG. 3. The liquid sprayer 110 may spray washer fluids simultaneously or sequentially on a plurality of sensors, or spray washer fluids only on sensors that require cleaning, and, in this regard, an example of a configuration of the liquid sprayer 110 is shown in FIG. 6.

The liquid controller 120 may control the washer fluid spraying of the liquid sprayer 110. For example, when the liquid controller 120 receives a cleaning request from the vehicle controller 160, the liquid controller 120 may control the liquid sprayer 110 to spray the washer fluid. When there is a cleaning request signal for a plurality of sensors, washer fluid spraying may be sequentially or simultaneously performed.

Figure 5:
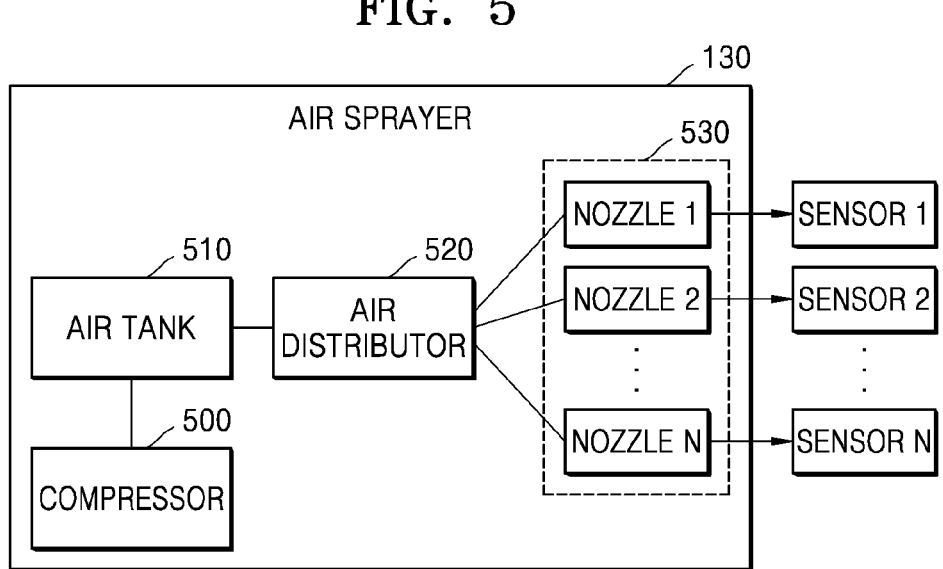
FIG. 5 is a view illustrating an example of a detailed structure of an air sprayer, according to an embodiment.

The air sprayer 130 may spray air on the sensor 150. Because there are a plurality of sensors in the vehicle, the air sprayer 130 may simultaneously or sequentially spray air on the plurality of sensors, or spray air only on sensors that require cleaning. An example of a configuration of the air sprayer 130 is shown in FIG. 5. Air sprayed on the sensor may be general air or compressed air. FIG. 5 is an example of spraying compressed air.

The air controller 140 may control the spraying of air of the air sprayer 130. For example, when the air controller 140 receives a cleaning request from the vehicle controller 160, the air controller 140 may control the air sprayer 130 to spray air.

The vehicle controller 160 may output a cleaning request command when the sensor 150 requires cleaning. For example, the vehicle controller 160 may identify a sensor that requires cleaning through various conventional methods. Because the method for the vehicle controller 160 to identify a sensor that requires cleaning is beyond the scope of the disclosure, descriptions thereof are omitted. The present embodiment is described assuming that the liquid controller 120 and the air controller 140 receive a cleaning request signal including sensor identification information from the vehicle controller 160.

The vehicle controller 160 may only output a cleaning request command and may not limit the cleaning method. Therefore, according to the cleaning request, the method of cleaning each sensor may be variously implemented. The present embodiment provides a method of performing cleaning through washer fluid spraying and air spraying when a cleaning request is received from the vehicle controller 160. For the sensor cleaning to be performed efficiently, the washer fluid spraying and the air spraying may be alternately performed. A method of controlling the spraying operations of the liquid sprayer 110 and the air sprayer 130 so as not to overlap each other will be described with reference to FIGS. 7 and 8.

Figure 2:
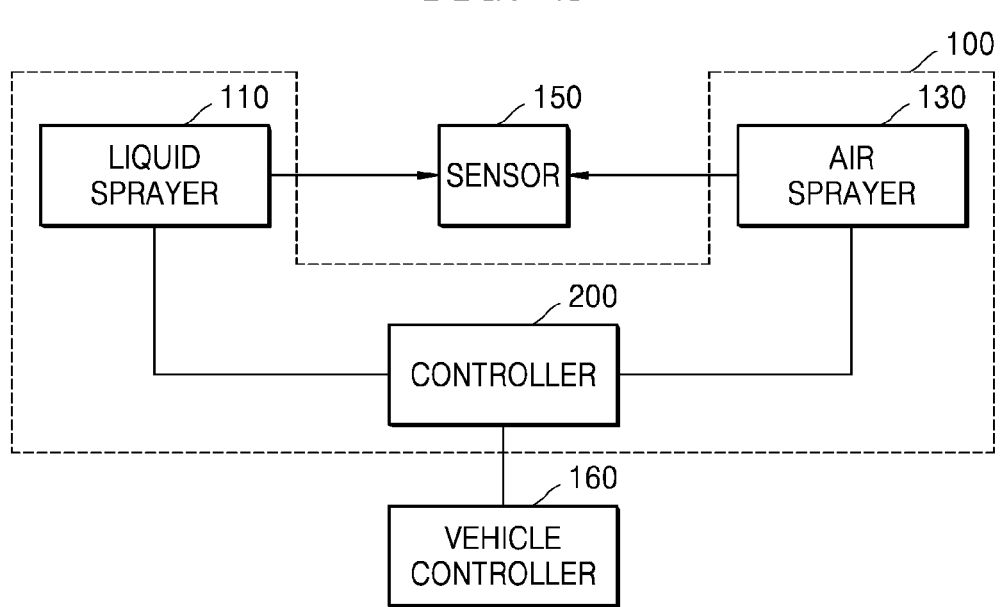
FIG. 2 is a view illustrating another example of the vehicle sensor cleaning apparatus according to an embodiment.

FIG. 2 is a view illustrating another example of the vehicle sensor cleaning apparatus according to an embodiment.

Referring to FIG. 2, a vehicle sensor cleaning apparatus 100 may include a liquid sprayer 110, an air sprayer 130, and a controller 200. The vehicle sensor cleaning apparatus 100 may be connected to a vehicle controller 160. Because the liquid sprayer 110, the air sprayer 130, the vehicle controller 160, and a sensor 150 of the present embodiment are the same as the configuration of FIG. 1, the descriptions corresponding thereto are omitted.

The present embodiment may include the controller 200 in which the liquid controller 120 and the air controller 140 of FIG. 1 are integrated. When the controller 200 receives a cleaning request from the vehicle controller 160, the liquid sprayer 110 and the air sprayer 130 may be controlled to simultaneously or sequentially spray the washer fluid and air. Each configuration and function of the liquid controller 120 and the air controller 140 may be integrally implemented in the controller 200.

However, hereinafter, for convenience of explanation, descriptions will be made based on the configuration of FIG. 1. Therefore, the functions and configurations of the liquid controller 120 and the air controller 140, which will be discussed later, may be implemented with the controller 200 of FIG. 2.

FIG. 3 is a view illustrating an example of a vehicle in which the vehicle sensor cleaning apparatus is implemented, according to an embodiment.

Referring to FIG. 3, a plurality of sensors are provided in a vehicle 300. On one side 310 of the vehicle, some components of the liquid sprayer 110 and the air sprayer 130 (e.g., an air tank and a washer fluid tank of FIGS. 5 and 6) may be provided. The present embodiment shows a case in which the air tank and the washer fluid tank are arranged in one location, but this is only an example, and the air tank and the washer fluid tank may be arranged in different locations of the vehicle. In some embodiments, a plurality of air tanks and a plurality of washer fluid tanks may be provided.

A nozzle that sprays air or washer fluid may be arranged in each sensor. Air is sprayed on the sensor through the air nozzle of FIG. 5, and the washer fluid is sprayed on the sensor through the liquid nozzle of FIG. 6.

One or more air distributors 330 and 332 may be provided for supplying compressed air of the air tank to the air nozzle arranged in each sensor. The air controller 140 may spray air on a desired sensor by controlling the air distributor 330 and 332.

One or more liquid distributors 320 may be provided for supplying the washer fluid of the washer fluid tank to the liquid nozzle arranged in each sensor. The liquid controller 120 may spray the washer fluid on a desired sensor by controlling the liquid distributor 320.

Figure 4:
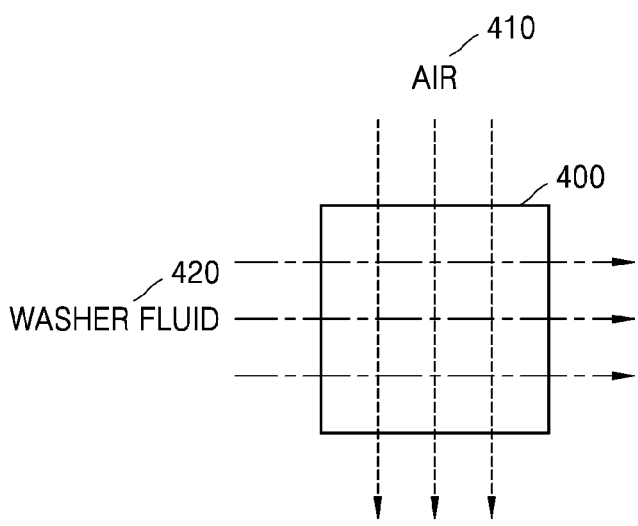
FIG. 4 is a view illustrating an example of a cleaning direction of a sensor, according to an embodiment.
Figure 4:
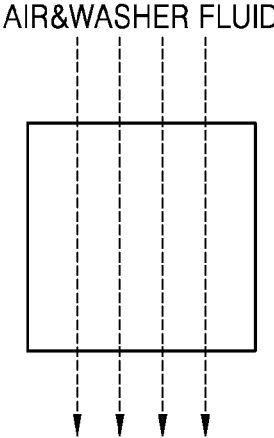
Figure 4:
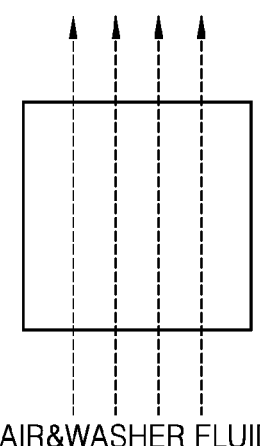

FIG. 4 is a view illustrating an example of a cleaning direction of a sensor, according to an embodiment.

Referring to FIG. 4, a direction 420 of a washer fluid sprayed on the surface of a sensor 400 and a direction 410 of air sprayed on the surface of the sensor 400 may be different from each other. In addition, the washer fluid and the air may be simultaneously or sequentially sprayed, or only one of the washer fluid and the air may be sprayed. For example, the liquid sprayer 110 may spray the washer fluid from the left to the right on the sensor 400, and the air sprayer 130 may spray the air from the top to the bottom of the sensor 400. The washer fluid and air sprayed in different directions may effectively remove foreign materials on the surface of the sensor 400. For example, air may be sprayed from the top to the bottom to remove the washer fluid or rainwater left on the surface of the sensor 400.

In another embodiment, the direction 420 of the washer fluid sprayed on the surface of the sensor 400 and the direction 410 of the air may be the same. For example, the washer fluid and the air may be sprayed from the top to the bottom (or from the bottom to the top) of the sensor 400. Through the simultaneous spraying of the washer fluid and air, the pressure on the surface of the sensor may be increased to effectively remove foreign materials on the surface. In addition, the direction and order of spraying the washer fluid and the air may vary depending on embodiments.

FIG. 5 is a view illustrating an example of a detailed structure of an air sprayer, according to an embodiment.

Referring to FIG. 5, an air sprayer 130 may include a compressor 500, an air tank 510, an air distributor 520, and a plurality of nozzles 530.

The compressor 500 may compress and stores air in the air tank 510. In an embodiment, the compressor 500 may include a plurality of motors. In this case, the compressor 500 may alternately use a plurality of motors to prevent a load from being added to one motor. A compressor 500 including one motor may be implemented. In another embodiment, a compression intensity of air stored in the air tank 510 may be adjusted through the compressor 500.

The air tank 510 may store the compressed air. In an embodiment, air may be sprayed on the sensor by using a propeller, etc. without the compressor 500 and the air tank 510. However, since the intensity of air generated through the propeller, etc. is weak, it is difficult to cleanly remove foreign materials or water on the surface of the sensor. Therefore, the present embodiment may increase the intensity (e.g., the speed) of air sprayed on the sensor by using compressed air stored in the air tank 510.

The air distributor 520 may distribute compressed air output from the air tank 510 to the plurality of nozzles 530. The nozzles 530 may be respectively arranged in the sensors and spray air on the sensors. In an example, the air distributor 520 may include a plurality of channels that output compressed air, and the channels are respectively connected to the nozzles 530 through air hoses. When the number of sensors is greater than the number of channels of the air distributor 520, a plurality of air distributors 520 may be provided. For example, the plurality of air distributors 520 may each be connected in parallel to the air tank 510, or the plurality of air distributors 520 may be connected to each other in a hierarchical structure such as a tree structure.

The air distributor 520 may turn on/off each channel under the control of the air controller 140. For example, when the air distributor 520 receives an on command of a first channel from the air controller 140, the air distributor 520 may output compressed air of the air tank 510 through the first channel, and a first nozzle connected to the first channel through an air hose may spray air on a first sensor. The on/off of the channel may be controlled through a solenoid valve, etc.

To control the performance of the air distributor 520 of turning each channel on/off, the air controller 140 may identify and store, in advance, which channel of the air distributor 520 each sensor is connected to. For example, if a relationship between first sensor identification information and the first channel is defined, when cleaning of the first sensor is required, the air controller 140 may transmit the on command of the first channel of the air distributor 520 to the air distributor 520.

FIG. 6 is a view illustrating an example of a detailed structure of a liquid sprayer, according to an embodiment.

Referring to FIG. 6, a liquid sprayer 110 may include a washer fluid tank 600, a washer pump 610, a liquid distributor 620, and at least one nozzle 630.

The washer fluid tank 600 may store the washer fluid. The washer pump 610 may output the washer fluid stored in the washer fluid tank 600 to the liquid distributor 620. The liquid distributor 620 may output the washer fluid received through the washer pump 610 through the nozzle 630. The washer pump 610 may output the washer fluid through motor driving. The nozzle 630 may spray the washer fluid on the sensor. Each nozzle 630 may be connected to the liquid distributor 620 through a liquid hose. In an embodiment, the nozzle 630 may protrude when the washer fluid is sprayed on the sensor and then retract back in when spraying is completed.

In another embodiment, there may be a plurality of washer pumps 610. For example, when there are 20 nozzles, 1st to 10th nozzles may be connected to a first washer pump (or a first motor), 11th to 14th nozzles may be connected to a second washer pump (or a second motor), and 15th to 20th nozzles may be connected to a third washer pump (or a third motor). The liquid controller 120 may control a plurality of washer pumps (or a plurality of motors) in parallel.

The liquid distributor 620 may select the nozzle 630 to output the washer fluid according to the control of the liquid controller 120. In an example, the liquid distributor 620 may include a plurality of channels that output the washer fluid, and the channels are respectively connected to the nozzles 630 through liquid hoses. When the number of sensors becomes greater than the number of channels of the liquid distributor 620, a plurality of liquid distributors 620 may be provided. For example, the plurality of liquid distributors 620 may each be connected in parallel to the washer pump 610, or the plurality of liquid distributors 620 may be connected to each other in a hierarchical structure such as a tree structure.

The liquid distributor 620 may spray the washer fluid on the desired sensor by turning on/off the plurality of channels. When the liquid distributor 620 receives the on command of the first channel from the liquid controller 120, the washer fluid is output through the first channel, and the first nozzle connected to the first channel may spray the washer fluid on the first sensor. The liquid controller 120 may identify and store in advance which channel of the liquid distributor 620 each sensor is connected to, like the air controller 140 described above. For example, if a relationship between the first sensor identification information and the first channel is defined in advance, when cleaning of the first sensor is required, the liquid controller 120 may transmit the on command of the first channel of the liquid distributor 620 to the liquid distributor 620. In an embodiment, each channel connected to each nozzle may be turned on/off through a solenoid valve.

In some embodiments, the liquid sprayer 110 may further include a heater 640. The heater 640 may supply heat to the liquid hose connecting each nozzle 630 to the liquid distributor 620, the washer pump 610, the washer fluid tank 600, or the liquid distributor 620. For example, when the external temperature is low, such as in winter, etc., the washer fluid in the liquid hose or liquid distributor 620 may freeze, and thus, the heater 640 may prevent the washer fluid from being frozen. In an embodiment, the liquid controller 120 may operate the heater 640 when the liquid controller 120 receives a command to operate the heater 640 or when an external temperature identified through a temperature sensor is less than a preset temperature.

Figure 7:
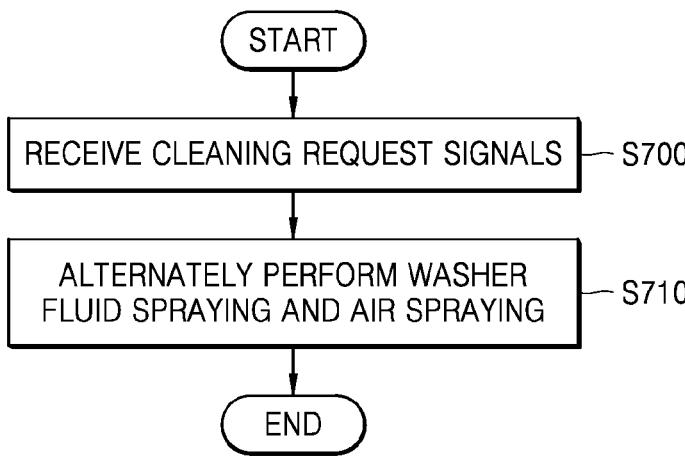
FIGS. 7 and 8 are views illustrating an example of an alternating control method of a vehicle sensor cleaning apparatus, according to an embodiment.
Figure 8:
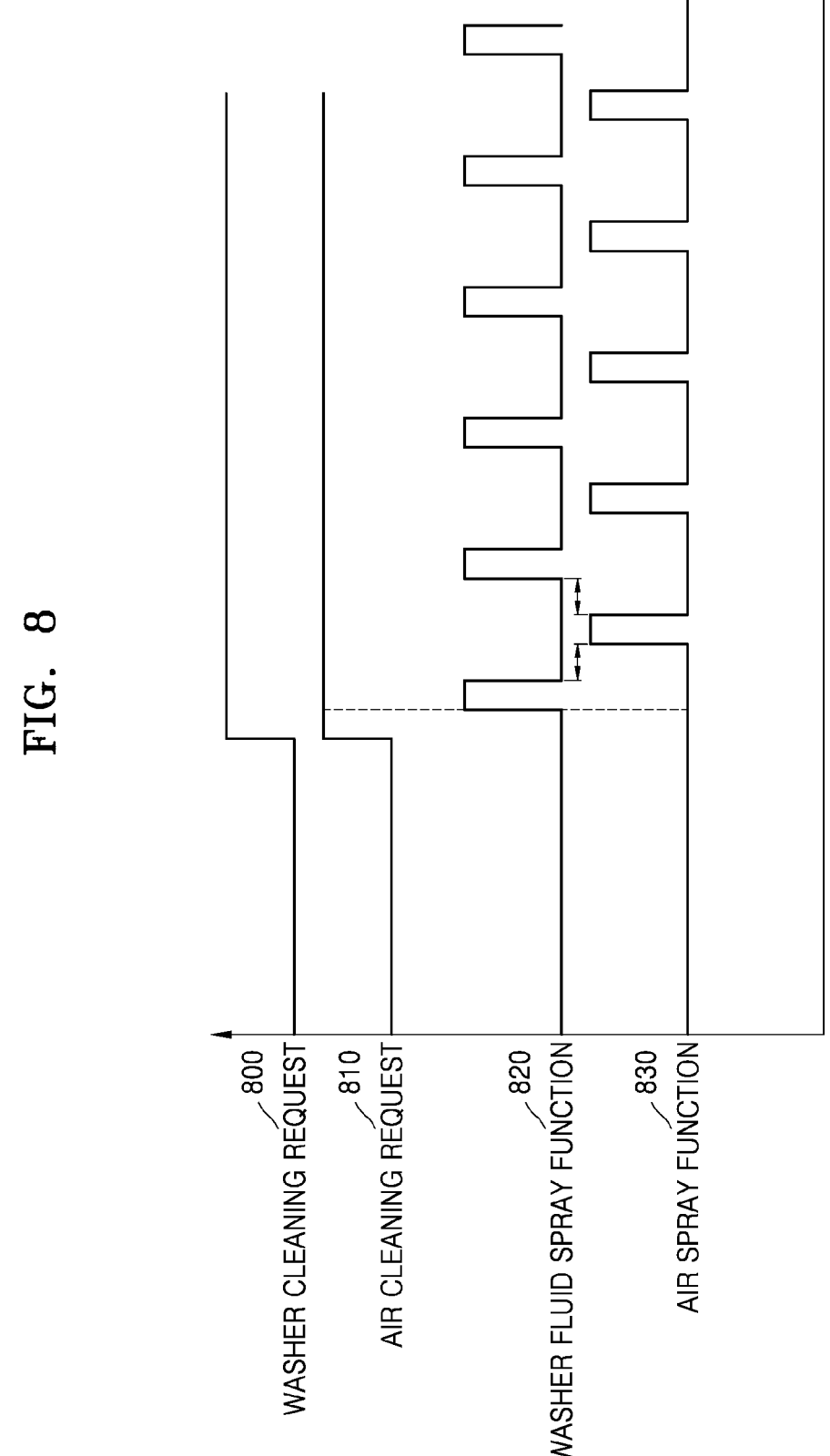

FIGS. 7 and 8 are views illustrating an example of an alternating control method of a vehicle sensor cleaning apparatus, according to an embodiment.

Referring to FIGS. 7 and 8, the liquid controller 120 and the air controller 140 may receive cleaning request signals 800 and 810 from the vehicle controller 160 (S700). The liquid controller 120 and the air controller 140 may be connected to the vehicle controller 160 via Controller Area Network (CAN) or CAN wth Flexible Data Rat (CAN FD).

The liquid controller 120 and the air controller 140 may set a washer fluid spraying control start point and an air spraying control start point to be different from each other to allow washer fluid and air to be alternately sprayed (S710). For example, the liquid controller 120 and the air controller 140 may control washer fluid spraying and air spraying to be alternately performed for the same sensor.

An alternating control method for the same sensor may be implemented in various ways.

In an embodiment, when the liquid controller 120 receives a cleaning request signal (i.e., a washer cleaning request 800), the liquid controller 120 may convert the mode to a liquid spray mode, in which washer fluid is sprayed on a sensor corresponding to the cleaning request signal (i.e., the washer cleaning request 800), and inform the air controller 140 of the on state of the liquid spray mode. The liquid controller 120 may be connected to the air controller 140, and the air controller 140 may not perform air spraying when receiving the on state of the liquid spray mode. If air is being sprayed when the air controller 140 receives the on status of the liquid spray mode, the air controller 140 may immediately stop spraying air. When the air controller 140 confirms that the liquid spray mode is in an off state through the liquid controller 120, the air controller 140 may perform air spraying according to a cleaning request signal (i.e., an air cleaning request 810). The air controller 140 may request and receive the status of the liquid spray mode from the liquid controller 120 at regular intervals, or the liquid controller 120 may send status information to the air controller 140 whenever the status of the liquid spray mode changes. In addition, the liquid controller 120 and the air controller 140 may share the state of the liquid spray mode through various methods.

In another embodiment, when the washer cleaning request 800 and the air cleaning request 810 simultaneously occur, the liquid controller 120 may immediately output a control signal 820 for washer fluid spraying according to the washer cleaning request 800. When the air controller 140 receives the air cleaning request 810, the air controller 140 may output a control signal 830 for air spraying after a predefined period of time has elapsed. That is, there is a certain time interval between the start point of a washer fluid spraying operation and the start point of an air spraying operation. For example, the liquid controller 120 may control the liquid sprayer 110 to spray washer fluid for a time t1 after receiving the washer cleaning request 800, and the air controller 140 may control the air sprayer 130 to spray air after the time t1 has elapsed after receiving the air cleaning request 810.

In another embodiment, washer fluid spraying and air spraying may be controlled to be alternately performed repeatedly. The liquid controller 120 may repeat the washer fluid spraying operation at regular periodic intervals, and the air controller 140 may also repeat the air spraying operation at regular periodic intervals. For example, the liquid controller 120 and the air controller 140 may repeat an on signal for the spraying operation at regular intervals. During an on signal period, washer fluid spraying or air spraying may be performed, and during an off signal period, a washer fluid or air spraying operation may not be performed. When the washer fluid spraying operation timing and the air spraying operation timing are different from each other, the cycles of the two operations are the same, and the on signal period for washer fluid spraying and the on signal period for air spraying do not overlap each other, the washer spraying operation and the air spraying operation may not overlap and alternate with each other.

Figures 9, 10:
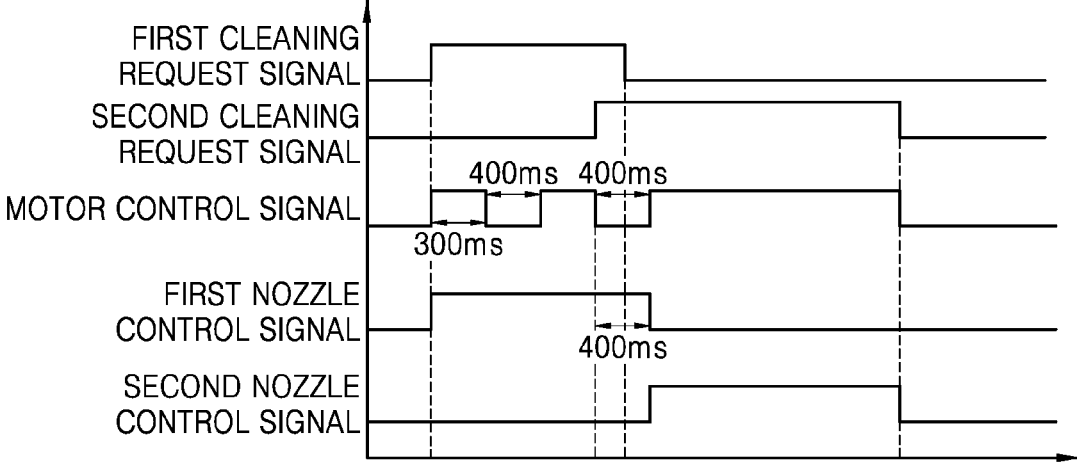
FIGS. 9 and 10 are views illustrating an example of a method of controlling a vehicle sensor cleaning apparatus based on a continuous control signal, according to an embodiment.

FIGS. 9 and 10 are views illustrating an example of a method of controlling a vehicle sensor cleaning apparatus based on a continuous control signal, according to an embodiment.

Referring to FIG. 9, when receiving a cleaning request signal, the liquid controller 120 may determine the type of sensor to be cleaned, based on sensor identification information included in the cleaning request signal, and may determine the duty cycle of a motor control signal corresponding to the type of sensor (S900). The motor control signal may be a Pulse Width Modulation (PWM) control signal for controlling the motor of the washer pump 610 of FIG. 6. The motor may operate while the motor control signal is in an on state and may output washer fluid.

Depending on the type of sensor, the spray intensity, spray time, or number of sprays of washer fluid may vary. For example, for camera sensors, washer fluid may be sprayed several times in short cycles, and for lidar sensors, washer fluid may be sprayed only once for a long period of time. To define the spray interval or spray duration of washer fluid for each sensor, the liquid controller 120 may store duty cycle information for each type of sensor in advance. In another embodiment, the control time of the motor control signal (i.e., the length of the motor control signal) may be different or the same depending on the type of sensor. When there are a plurality of motors and each nozzle connected to each motor, the plurality of motors may be independently controlled. However, for convenience of explanation, the description below assumes that there is only one motor.

The liquid controller 120 may output the motor control signal having an identified duty cycle and a control signal (i.e., a nozzle control signal) that turns on the nozzle of a sensor corresponding to the cleaning request signal (S910). Referring to FIG. 10, the liquid controller 120 may sequentially process a first cleaning request signal for a camera and a second cleaning request signal for a LiDar according to a reception order. The camera may have a duty cycle having an on period of 300 ms and an off period of 400 ms, and the LiDar may have a duty cycle having 100% of an on period without an off period. In this case, the liquid controller 120 may output a motor control signal having a duty cycle for the camera, and an on control signal (i.e., a first nozzle control signal) for a first nozzle that sprays washer fluid to the camera while a first cleaning request signal is in the on period. When the first cleaning request signal is in an off state, the liquid controller 120 may output a motor control signal having a duty cycle for the LiDar, and an on control signal (i.e., a second nozzle control signal) for a second nozzle corresponding to a LiDar sensor according to a second cleaning request signal. The on control signal for the nozzle may be a signal for controlling a valve (e.g., a solenoid valve) that opens and closes each channel of the liquid distributor 620 of FIG. 6. During an on control signal, a corresponding valve is open, and during an off control signal, a corresponding valve is closed.

When the cleaning request signal is turned off, the liquid controller 120 may control the motor control signal and the nozzle control signal of a corresponding sensor to be in an off state (S920). When the nozzle is designed to protrude to spray washer fluid and retract back in when spraying is complete, a minimum amount of time (i.e. a return time) is required for the nozzle to return to its original position when the cleaning request signal is turned off. To this end, the liquid controller 120 may not immediately change the nozzle control signal to an off state when the cleaning request signal is turned off, but may change the nozzle control signal to an off state when one cycle of the motor control signal is completed. In another embodiment, when the nozzle is fixed rather than moving back and forth, the liquid controller 120 may immediately control both the motor control signal and the nozzle control signal to be in an off state when the cleaning request signal is turned off.

In the example of FIG. 10, the first cleaning request signal may be a cleaning request signal for a sensor (e.g., a camera) that requires a nozzle's return time, and the second cleaning request signal may be a cleaning request signal for a sensor (e.g., a LiDar) that does not require a nozzle's return time. Therefore, with respect to the liquid controller 120, the first nozzle control signal for the first cleaning request signal may be turned off when the cycle of the motor control signal is completed, and the motor control signal for the second cleaning request signal and the second nozzle control signal may be simultaneously turned off when the second cleaning request signal is turned off. The following embodiments will be described assuming that there is cleaning of a sensor that requires a nozzle return time.

When the second cleaning request signal is received before a washer fluid spraying operation (i.e., cleaning operation) according to the first cleaning request signal is completed, the liquid controller 120 may sequentially process each cleaning request signal in the order of reception. In an embodiment, when receiving the second cleaning request signal before the first cleaning request signal ends, the liquid controller 120 may complete a cleaning operation corresponding to the first cleaning request signal and then maintain the second cleaning request signal in an on state for a predefined period of time for a corresponding sensor. In this case, so that a cleaning operation according to the second cleaning request signal does not affect the first nozzle, the liquid controller 120 may output a motor control signal and a second nozzle control signal corresponding to the second cleaning request signal when the cycle of a motor control signal corresponding to the first cleaning request signal is completed (i.e., when the first nozzle control signal is turned off). In another embodiment, washer fluid may be sprayed on a plurality of sensors simultaneously, which will be discussed with reference to FIG. 12 and below.

The present embodiment describes the control process for washer fluid spraying, but the following embodiments, including the present embodiment, may be applied to control for air spraying. In addition, washer fluid spraying and air spraying may be alternately performed using the method descried with reference to FIGS. 7 and 8.

Figure 11:
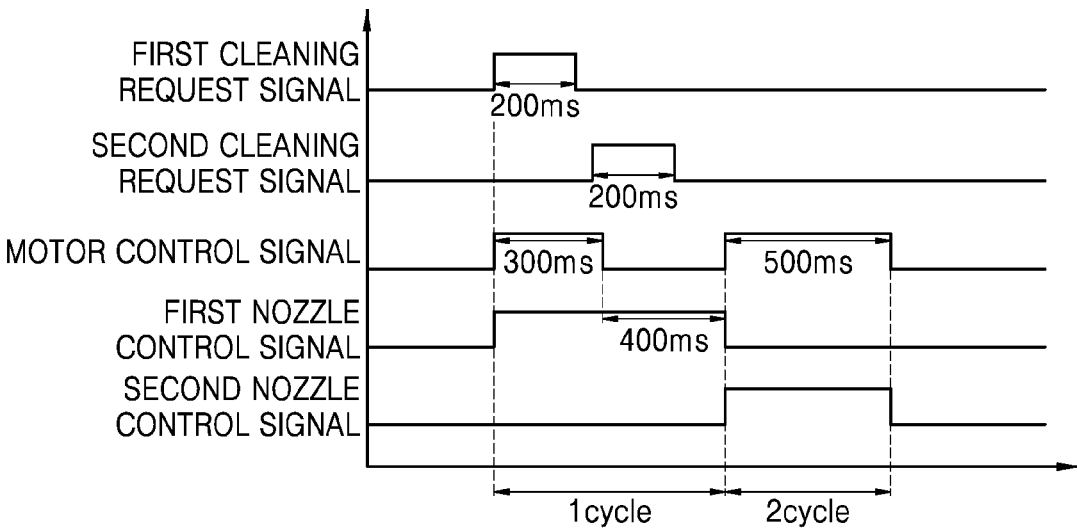
FIG. 11 is a view illustrating an example of a method of controlling a vehicle sensor cleaning apparatus based on a trigger signal, according to an embodiment

FIG. 11 is a view illustrating an example of a method of controlling a vehicle sensor cleaning apparatus based on a trigger signal, according to an embodiment.

Referring to FIG. 11, the liquid controller 120 may use a cleaning request signal as a trigger signal to control washer fluid spraying. For example, when the liquid controller 120 receives a first cleaning request signal, the liquid controller 120 may output a motor control signal and a first nozzle control signal for a sensor corresponding to the first cleaning request signal. Because the first cleaning request signal is used as a trigger signal, the liquid controller 120 may predefine the duty cycle of the motor control signal and the length (e.g., the number of cycles) of the motor control signal. That is, the liquid controller 120 may output a motor control signal according to the duty cycle and cycle number of the sensor corresponding to the first cleaning request signal, and the first nozzle control signal may be in an on state while the motor control signal is output.

The present embodiment shows a case where the motor control signal is defined as 1 cycle. When motor control signals for cleaning request signals for various sensors are all defined as 1 cycle, the liquid controller 120 may store the duty cycle and not store the number of cycles. The present embodiment shows a case in which the first cleaning request signal is a cleaning request signal for a sensor (e.g., a camera) that requires a return time and the second cleaning request signal is a cleaning request signal for a sensor (e.g., a LiDar) that does not require a return time.

When the second cleaning request signal is received during a cleaning operation for a first sensor (i.e., before the first nozzle control signal is turned off), the liquid controller 120 may perform a cleaning operation on a second sensor after completing the cleaning operation on the first sensor (i.e., after the first nozzle control signal is turned off). That is, when the return time of a nozzle is required, the liquid controller 120 may output a motor control signal according to the duty cycle of a sensor corresponding to the second cleaning request signal after the cycle of a motor control signal according to the first cleaning request signal is completed, and may maintain the second nozzle control signal in an on state while the motor control signal is output. Because the nozzle of the second sensor for the second cleaning request signal does not require a return time, when the motor control signal is turned off, the second nozzle control signal may also be turned off. That is, the length of the on period of the nozzle control signal may vary depending on whether the nozzle's return time is necessary.

FIGS. 10 and 11 show a case in which, when the second cleaning request signal is received before a cleaning operation according to the first cleaning request signal is completed, the liquid controller 120 sequentially processes each cleaning request signal in the order of reception. In another embodiment, washer fluid may be sprayed on a plurality of sensors simultaneously, which will be discussed with reference to FIG. 12 and below.

FIGS. 12 to 16 are views illustrating an example of a multiple spraying control method of a vehicle sensor cleaning apparatus, according to an embodiment.

Figure 12:
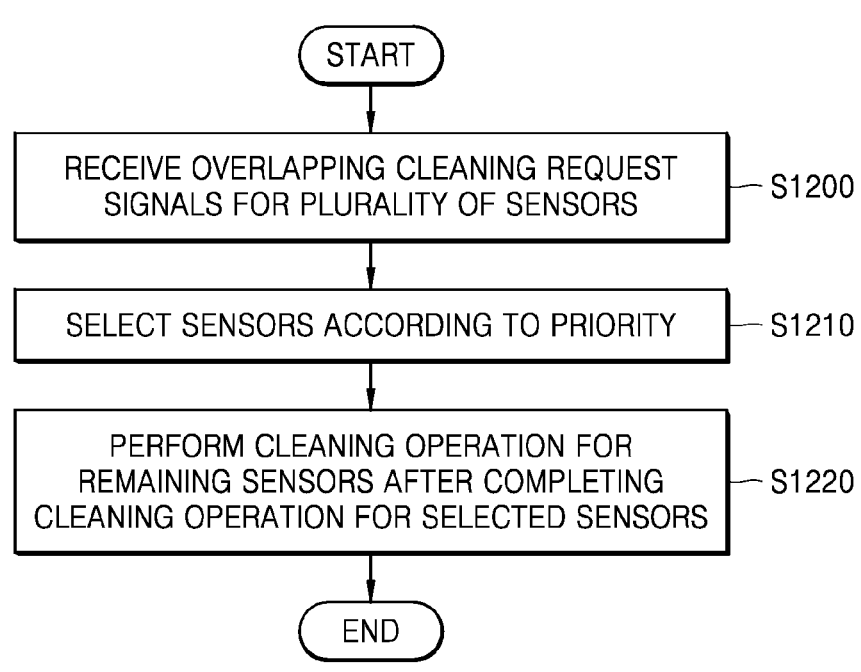
FIGS. 12 to 16 are views illustrating an example of a multiple spraying control method of a vehicle sensor cleaning apparatus, according to an embodiment.
Figure 13:
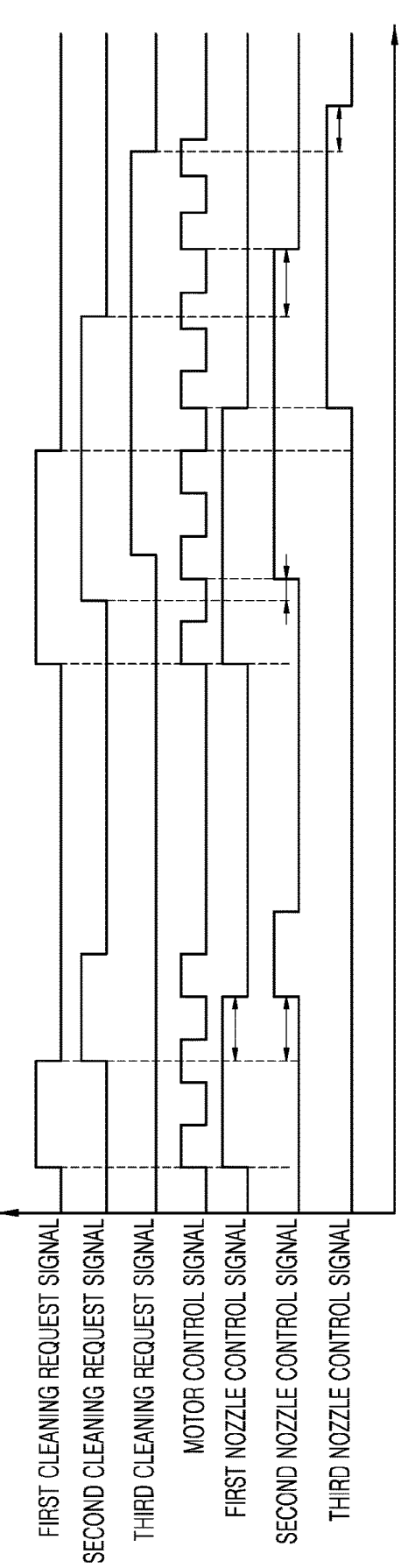
Figure 14:
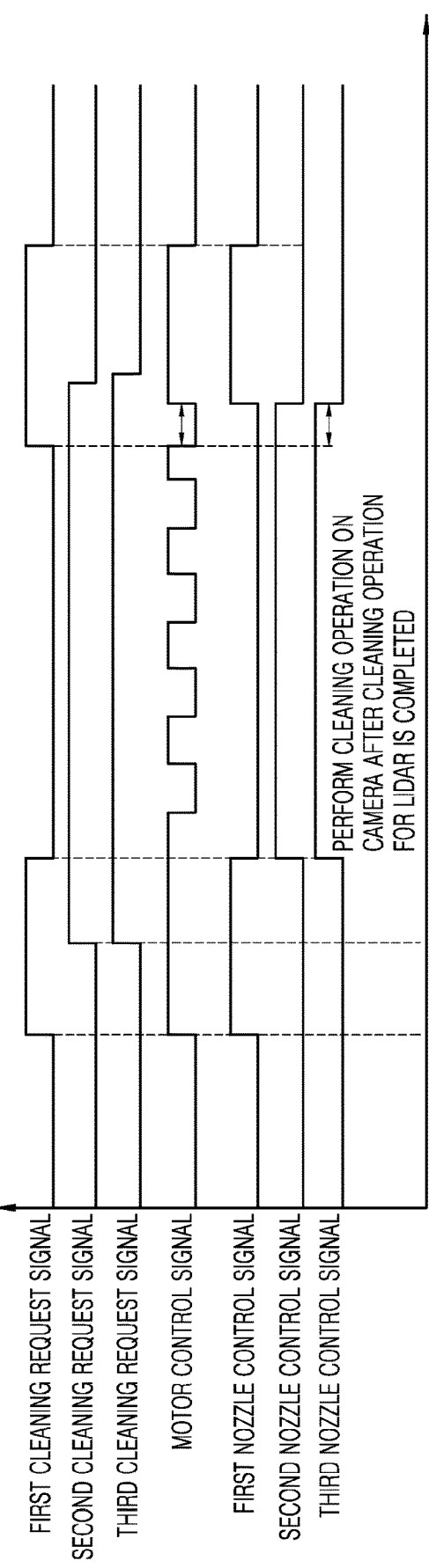
Figure 15:
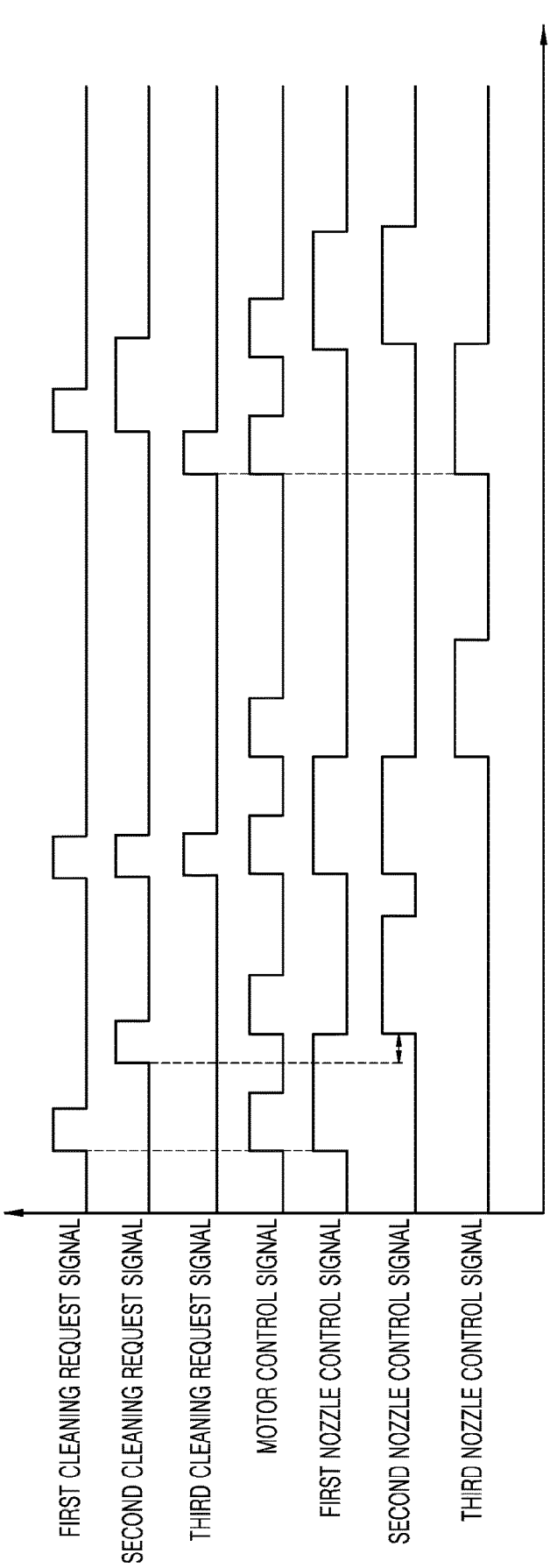
Figure 16:
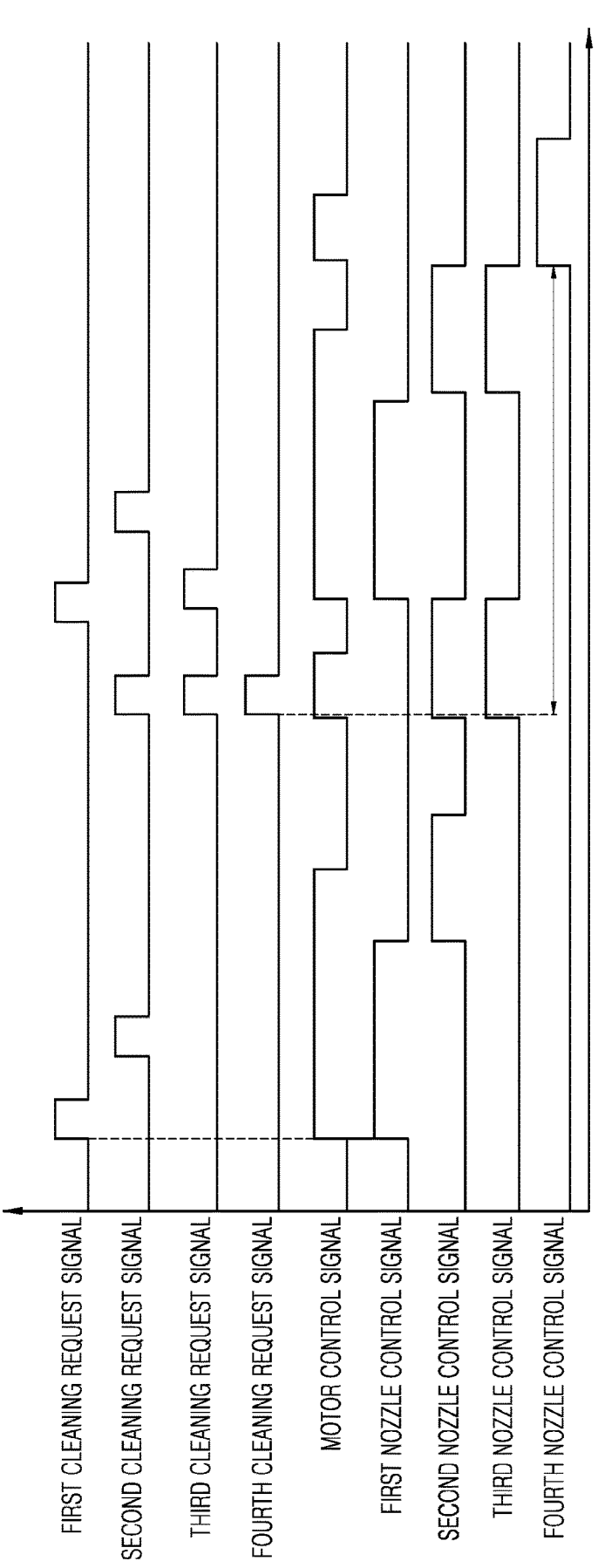

Referring to FIG. 12, the liquid controller 120 may receive overlapping cleaning request signals for a plurality of sensors (S1200). A cleaning request signal may be a continuous signal indicating a cleaning operation period, as shown in FIG. 10, or may be a trigger signal for starting a cleaning operation, as shown in FIG. 11. An example of a multiple spraying control method based on the form of the continuous cleaning request signal of FIG. 10 is shown in FIGS. 13 and 14. An example of a multiple spraying control method based on the form of a trigger signal is shown in FIGS. 15 and 16.

The liquid controller 120 may select a predefined number of sensors according to a predefined priority (S1210), and may simultaneously perform control operations for spraying washer fluid for selected sensors and then perform control operations for spraying washer fluid for the remaining sensors (S1220).

When multiple sprayings are performed, the sprayed washer fluid may be dispersed and spouted through a plurality of nozzles, and thus, the spraying pressure or spraying amount may be lowered. Therefore, in the case of multiple sprayings, the maximum number of sprayings may be defined in advance. When the duty cycle of the motor control signal is different depending on the type of sensor, it is necessary to consider the type of sensor when performing multiple sprayings. The following embodiment will be described assuming that the maximum number of nozzles of a motor, through which washer fluid may be simultaneously sprayed, is two and that the duty cycle of the motor control signal differs depending on the type of sensor.

First, referring to FIGS. 13 and 14, a method of controlling multiple sprayings based on continuous cleaning request signals is described.

FIG. 13 illustrates a method of controlling multiple sprayings for the same type of sensor. The present embodiment will be described assuming that there is a nozzle that requires a return time. When the liquid controller 120 receives a first cleaning request signal, the liquid controller 120 may output a motor control signal and a first nozzle control signal for cleaning a first sensor, according to the first cleaning request signal. When the first cleaning request signal is turned off during cleaning of the first sensor and a new second cleaning request signal is received, the liquid controller 120 may turn off the first nozzle control signal when one cycle of the motor control signal is completed in consideration of the return time of the nozzle. Then, the liquid controller 120 may output a motor control signal and a second nozzle control signal for a second sensor, according to the second cleaning request signal.

Thereafter, when a new second cleaning request signal and a new third cleaning request signal are received while a cleaning operation is performed according to the newly received first cleaning request signal, the liquid controller 120 may determine the priorities of the second and third cleaning request signals. The liquid controller 120 may determine a predefined priority for each sensor (i.e., each nozzle). When the priority of the second sensor (i.e., the second nozzle) is higher than the priority of the third sensor (i.e., the third nozzle), the liquid controller 120 may output a second nozzle control signal when one cycle of the motor control signal for the first sensor is completed. Because the type of sensor to be cleaned is the same, the duty cycle of the motor control signal may remain the same. When the cleaning operation for the first sensor is completed, the liquid controller 120 may output a motor control signal and a third nozzle control signal for the cleaning operation for the third sensor. That is, cleaning operations for two sensors may overlap each other.

Referring to FIG. 14, a multiple spraying control method for different types of sensors is shown. It is assumed that the first cleaning request signal is a cleaning request signal for a LiDar that does not require a nozzle return time and the second and third cleaning request signals are cleaning request signals for first and second cameras, respectively, that require a nozzle return time. The liquid controller 120 may receive the second cleaning request signal and the third cleaning request signal while outputting a motor control signal and a first nozzle control signal for cleaning the LiDar according to the first cleaning request signal.

The second and third cleaning request signals may be cleaning request signals for the cameras, and the first cleaning request signal may be a cleaning request signal for the LiDar. The types of sensors to be cleaned may be different from each other. In other words, because the types of sensors are different from each other, the duty cycles of motor control signals may be different from each other. Therefore, after the cleaning operation for the LiDar is completed, the liquid controller 120 may simultaneously output a motor control signal for cleaning the first and second cameras corresponding to the second and third cleaning request signals and second and third nozzle control signals. When receiving a new first cleaning request signal during a cleaning operation for the second camera, the liquid controller 120 may output a motor control signal for the cleaning of a LiDar corresponding to the first cleaning request signal and a first nozzle control signal after completing the cleaning operation for the two cameras.

Next, with reference to FIGS. 15 and 16, a method of controlling multiple sprayings based on a trigger signal is described.

Referring to FIG. 15, a method of controlling multiple sprayings for the same type of sensor is shown. When the liquid controller 120 receives a first cleaning request signal, the liquid controller 120 may output a motor control signal and a first nozzle control signal for cleaning a first sensor, according to the first cleaning request signal. When the liquid controller 120 receives a second cleaning request signal during a cleaning operation of the first sensor, the liquid controller 120 may output a second nozzle control signal according to the second cleaning request signal. Because the duty cycle of the motor control signal is the same, the motor control signal may be continuously output as is.

Thereafter, when new first to third cleaning request signals are simultaneously received, the liquid controller 120 may select a plurality of sensors (two in the present embodiment) according to a predefined priority. When first and second sensors are selected according to the priority, the liquid controller 120 may output a motor control signal and first and second nozzle control signals for the cleaning operation of the first and second sensor. When the cleaning operation of the first and second sensors is completed, the liquid controller 120 may output a motor control signal and a third nozzle control signal for the cleaning operation of a third sensor.

Thereafter, when the third cleaning request signal is received again, the liquid controller 120 may performs a cleaning operation on the third sensor. When the first and second cleaning request signals are simultaneously received before the cleaning operation for the third sensor is completed and a third cleaning operation is terminated with the current cycle of the motor control signal, the liquid controller 120 may output motor control signals for the first and second sensors and first and second nozzle control signals when the cycle of the motor control signal for the third sensor is completed.

In another embodiment, the number of cleaning operations may be defined depending on the length of a cleaning request signal. For example, when the length of the second cleaning request signal increases by two times, the liquid controller 120 may perform a cleaning operation on a sensor corresponding to the second cleaning request signal twice.

Referring to FIG. 16, a multiple spraying control method for different types of sensors is shown. It is assumed that the first cleaning request signal is a cleaning request signal for a LiDar and the second to fourth cleaning request signals are cleaning request signals for cameras. When receiving the second cleaning request signal during a cleaning operation for the LiDar according to the first cleaning request signal, the liquid controller 120 may complete the cleaning operation for the LiDar and then perform a cleaning operation according to the second cleaning request signal.

In another embodiment, when the motor control signal for the LiDar consists of a duty cycle of 100%, which is the entire on period, the liquid controller 120 may provide a motor control signal and a second nozzle control signal according to the second cleaning request signal in advance by the duty cycle of a camera before a motor control signal of the LiDar ends. That is, portions of the motor control signals may overlap each other.

Thereafter, when simultaneously receiving the second to fourth cleaning request signals, the liquid controller 120 may process, according to priority, some cleaning request signals first and then process the remaining cleaning request signals because the second to fourth cleaning request signals are all cleaning request signals for the same sensor. For example, when first and second cameras corresponding to the second and third cleaning request signals have high priority, the liquid controller 120 may output a motor control signal and second and third nozzle control signals for cleaning the first and second cameras.

When receiving the first cleaning request signal for the LiDar and the newly third cleaning request signal for the camera during the cleaning operation for the first and second cameras, the liquid controller 120 may determine the priority between the first cleaning request signal for the LiDar, related to the newly received third cleaning request signal for the camera, and the fourth cleaning request signal that has not yet been processed. That is, the liquid controller 120 may determine the priority between currently received cleaning request signals each time before performing a new cleaning operation.

When the LiDar has the highest priority, the liquid controller 120 may perform a cleaning operation on the LiDar first when the cleaning operation on the first and second cameras is completed. When a new first cleaning request signal is received again during a cleaning operation for the LiDar, the liquid controller 120 may determine the priority between the newly received first cleaning request signal and the second and third cleaning request signals that have not yet been processed. When the first and second cleaning request signals have high priorities, the liquid controller 120 may first perform a camera cleaning operation for the first and second cleaning request signals and then perform a cleaning operation for the third cleaning request signal.

The control methods described with reference to FIGS. 9 to 16 are examples, and the control methods of the embodiments may be mixed, or some of the control methods may be modified.

Figure 17:
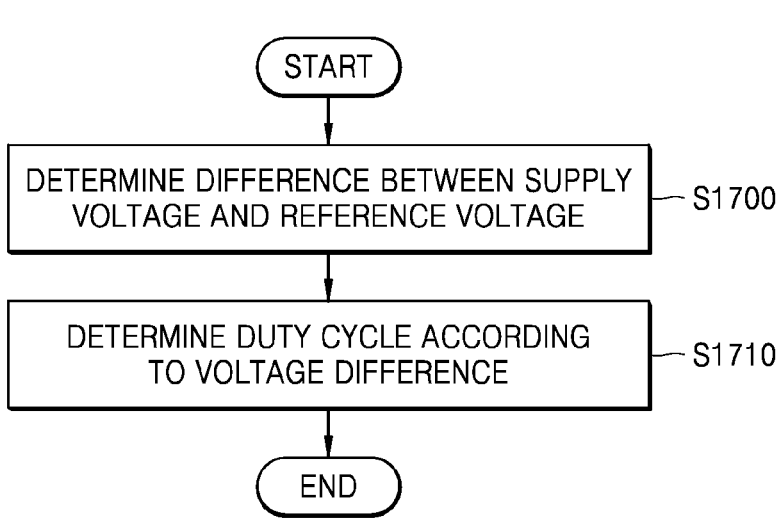
FIGS. 17 and 18 are views illustrating an example of a voltage compensation control method of a vehicle sensor cleaning apparatus, according to an embodiment.
Figure 18:
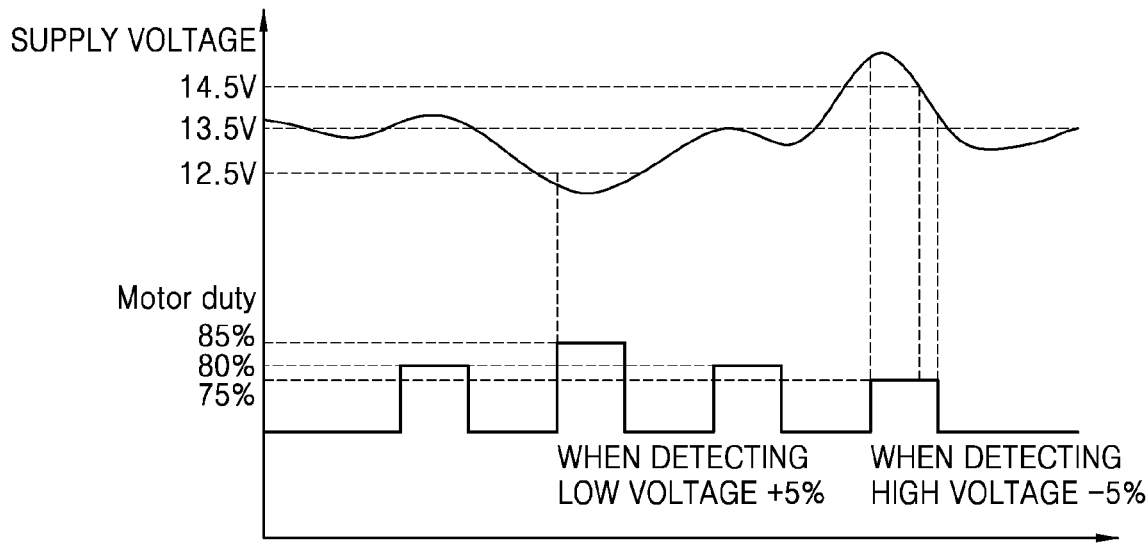

FIGS. 17 and 18 are views illustrating an example of a voltage compensation control method of a vehicle sensor cleaning apparatus, according to an embodiment.

Referring to FIGS. 17 and 18, the liquid controller 120 (or air controller 140) may determine the difference between a supply voltage and a reference voltage (S1700). The supply voltage may refer to a voltage (e.g., a battery voltage) supplied from a vehicle. The reference voltage may be a preset voltage and may be set to various values depending on embodiments.

The liquid controller 120 (or air controller 140) may determine the duty cycle of a motor control signal based on the difference between two voltages, that is, the supply voltage and the reference voltage (S1710). Depending on the type of sensor, the duty cycle of a motor control signal may be predefined. For example, the duty cycle of a motor control signal for a camera may be set to 80%. The liquid controller 120 (or air controller 140) may lower the duty cycle of the motor control signal when the supply voltage is higher than the reference voltage, and conversely, may increase the duty cycle of the motor control signal when the supply voltage is lower than the reference voltage. A duty cycle adjustment ratio according to the difference between the supply voltage and the reference voltage may be set in various ways depending on embodiments. For example, assuming that the duty cycle of the motor control signal for the camera is 80%, when the supply voltage exceeds the reference voltage by 5%, the liquid controller 120 may lower the duty cycle by 5% and adjust the duty cycle to 75%. In addition, when the supply voltage is 5% lower than the reference voltage, the liquid controller 120 may adjust the duty cycle to 85%, which is 5% higher than the original value.

Figure 19:
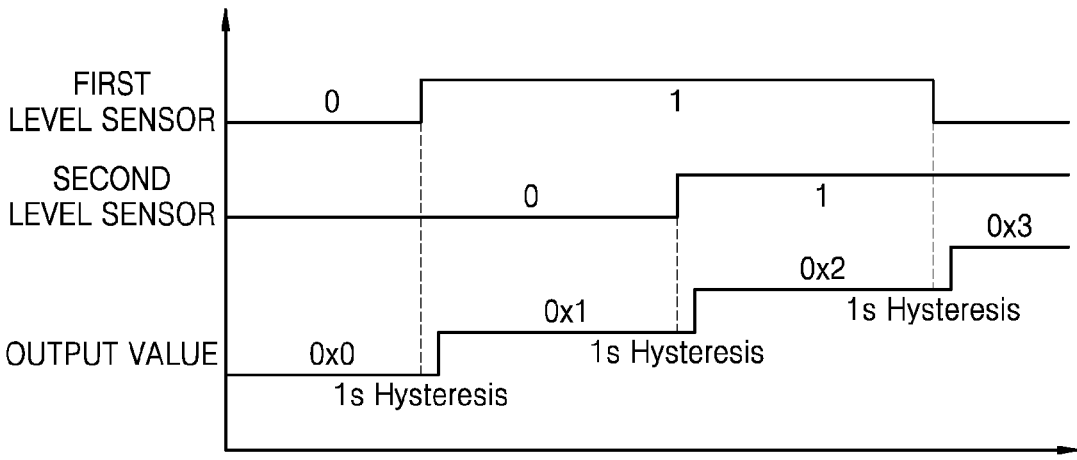
FIG. 19 is a view illustrating an example of a method of determining the amount of washer fluid in a vehicle sensor cleaning apparatus, according to an embodiment.

FIG. 19 is a view illustrating an example of a method of determining the amount of washer fluid in a vehicle sensor cleaning apparatus, according to an embodiment.

Referring to FIG. 19, the liquid controller 120 may use a plurality of level sensors to determine the remaining amount of washer fluid remaining in a washer fluid tank. For example, when there are two level sensors at different heights in the washer fluid tank, the liquid controller 120 may generate and output an output value indicating the remaining amount of washer fluid according to a sensing value of each level sensor.

Figure 20:
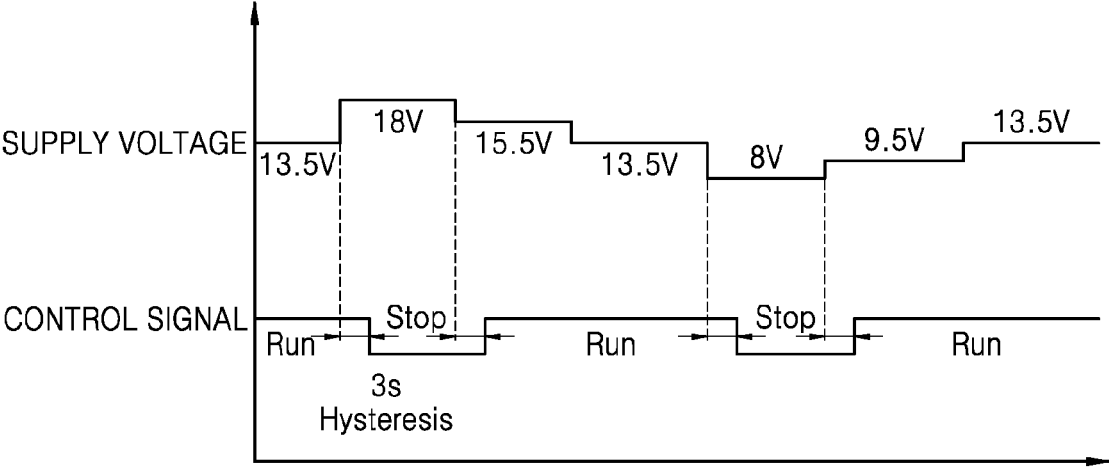
FIGS. 20 and 21 are views illustrating an example of a control method for protecting a vehicle sensor cleaning apparatus from overvoltage or overcurrent, according to an embodiment.
Figure 21:
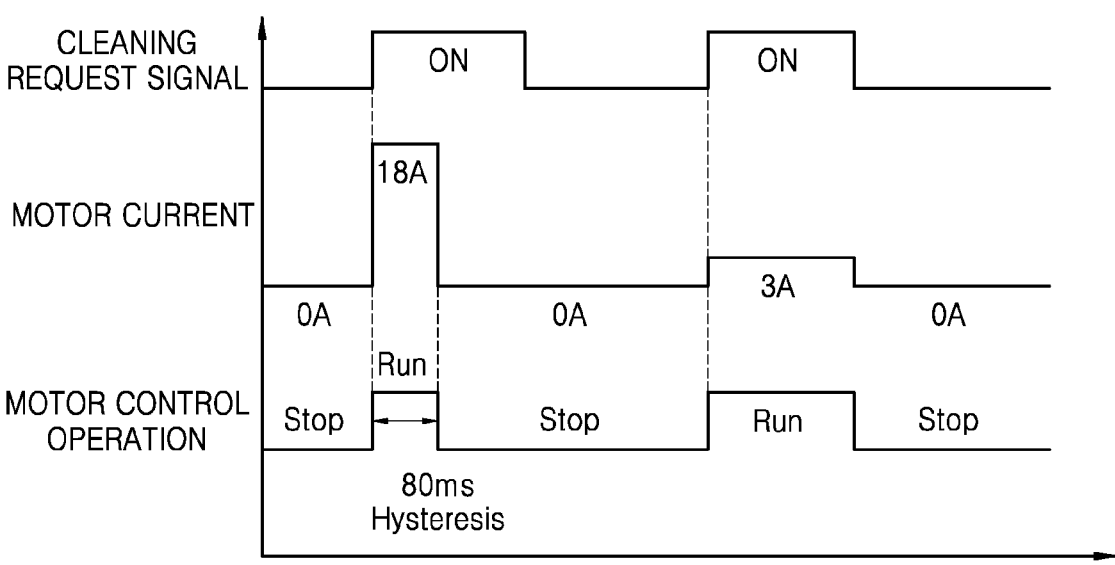

FIGS. 20 and 21 are views illustrating an example of a control method of protecting a vehicle sensor cleaning apparatus from overvoltage or overcurrent, according to an embodiment.

Referring to FIG. 20, the liquid controller 120 (or air controller 140) may stop the operation of an actuator, such as a motor, when a supply voltage exceeds a predefined first reference range (e.g., about 9 volts to about 16 volts). In this case, the actuator may refer to various driving devices (e.g., motor, solenoid valve, and heater) included in the vehicle sensor cleaning apparatus. The liquid controller 120 (or air controller 140) may convert the state of the actuator to an operable state when the supply voltage falls within a predefined second reference range (e.g., about 9.3 volts to 15.7 volts) and a predefined time (e.g., 3 seconds) elapses. The second reference range may be a smaller section range included in the first reference range. Hysteresis (e.g., 3 seconds) may be set to stop or restart the actuator.

Referring to FIG. 21, the liquid controller 120 (or air controller 140) may stop a control operation of a motor when the current of an actuator, such as the motor, exceeds a predefined first reference range (e.g., 12A or more). When the motor current reaches a predefined second reference range (e.g., 10 amperes or less) and a predefined time elapses, the liquid controller 120 (or air controller 140) may convert the state of the motor to a state in which a control operation of the motor is possible. Hysteresis (e.g., 80 milliseconds) for stopping or restarting the actuator may be set.

Figure 22:
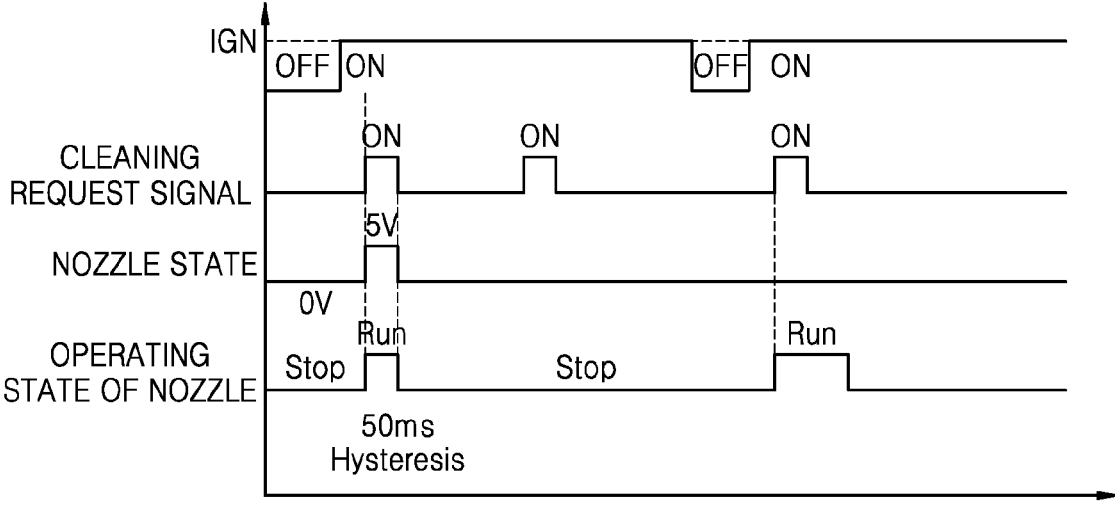
FIG. 22 is a view illustrating an example of an actuator protection control method of a vehicle sensor cleaning apparatus, according to an embodiment.

FIG. 22 is a view illustrating an example of an actuator protection control method of a vehicle sensor cleaning apparatus, according to an embodiment.

Referring to FIG. 22, the liquid controller 120 (or air controller 140) may control the operating state of a nozzle according to a nozzle state. For example, when controlling a nozzle according to a cleaning request signal, when a nozzle status signal indicates a fault, the liquid controller 120 (or air controller 140) may stop the operation of the nozzle. Thereafter, when an ignition signal IGN is turned off and then turned on again and the nozzle status signal is normal when a cleaning request signal is input, the liquid controller 120 (or air controller 140) may convert the state of the nozzle to an operable state. Hysteresis (e.g., 50 milliseconds) for the operation of the nozzle may be set.

The disclosure may also be implemented as a computer-readable program code on a computer-readable record medium. The computer-readable recording medium may include every type of recording device storing data readable by a computer system. Examples of the computer-readable recording media may include ROM, RAM, CD-ROM, magnetic tapes, floppy disks, optical data storage devices, etc. In addition, the computer-readable recording media may be distributed to a computer system connected by a network such that a computer-readable code may be stored and executed in a distributed method.

According to an embodiment, washer fluid and air may be used together to cleanly remove foreign materials on the surface of the sensor. According to another embodiment, the cleaning order for a plurality of sensors may be optimized, and spraying pressure may be prevented from being lowered during a cleaning operation for a plurality of sensors. According to another embodiment, cleaning performance may be maintained by compensating duty according to voltage fluctuations. According to another embodiment, the remaining amount of washer fluid may be determined. According to another embodiment, the vehicle sensor cleaning apparatus may be protected from high voltage or overcurrent.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A vehicle sensor cleaning apparatus connected to a vehicle controller of a vehicle comprising:

a liquid sprayer configured to spray washer fluid at at least one sensor located in a vehicle;

an air sprayer configured to spray air at the at least one sensor;

a liquid controller configured to control the liquid sprayer according to a cleaning request signal received from the vehicle controller; and an air controller configured to control the air sprayer according to a cleaning request signal received from the vehicle controller, wherein the liquid sprayer comprises:

a washer fluid tank configured to store washer fluid;

a washer pump motor configured to output the washer fluid stored in the washer fluid tank to a liquid distributor; and a plurality of nozzles configured to spray the washer fluid output from the liquid distributor toward a plurality of sensors, wherein a number of nozzles capable of simultaneously spraying the washer fluid is predefined, wherein the liquid controller is configured to output a motor control signal for the washer pump motor and nozzle control signals for controlling ON/OFF states of the respective nozzles according to the cleaning request signal, wherein, when second to N-th (wherein N is 3 or greater) cleaning request signals for second to N-th sensors of a same type are received while performing a cleaning operation corresponding to a first cleaning request signal for a first sensor, the liquid controller is configured to:

determine priorities of the second to N-th cleaning request signals;

perform, within the number of nozzles capable of simultaneously spraying the washer fluid, cleaning operations corresponding to the cleaning request signals selected according to the priorities in an overlapping manner with the cleaning operation corresponding to the first cleaning request signal; and after completion of the cleaning operation corresponding to the first cleaning request signal, perform in an overlapping manner a cleaning operation corresponding to a cleaning request signal having a next priority.

2. The vehicle sensor cleaning apparatus of claim 1, wherein the liquid controller is further configured to set a liquid spray mode to an ON state indicating the washer fluid is being sprayed when starting a control operation for spraying the washer fluid at the at least one sensor and set the liquid spray mode to an OFF state indicating the washer fluid is not being sprayed, and the air controller is further configured to stop spraying the air when receiving the ON state of the liquid spray mode from the liquid controller and perform a control operation to spray the air when receiving an OFF state of the liquid spray mode indicating the washer fluid is not being sprayed.

3. The vehicle sensor cleaning apparatus of claim 1, wherein the liquid controller is further configured to output the motor control signal having a duty cycle to the washer pump motor when receiving the cleaning request signal.

4. The vehicle sensor cleaning apparatus of claim 3, wherein the liquid controller is further configured to control the nozzles of the liquid sprayer, which sprays the washer fluid, to be turned off when a cycle of the motor control signal is completed.

5. The vehicle sensor cleaning apparatus of claim 1, wherein the liquid controller is further configured to adjust a duty cycle of a motor control signal for the washer pump motor according to a difference between a predefined reference voltage and a supply voltage supplied from the vehicle.

6. The vehicle sensor cleaning apparatus of claim 1, wherein the liquid controller is further configured to output a value indicating an amount of the washer fluid in the washer fluid tank of the liquid sprayer based on sensing values of a plurality of level sensors which located at different heights in the washer fluid tank.

7. The vehicle sensor cleaning apparatus of claim 1, wherein the liquid controller is further configured to stop the washer fluid spraying when a supply voltage or a supply current supplied from the vehicle for driving the washer pump motor is outside a predefined first reference range and resume the control operation when the supply voltage or the supply current falls within a predefined second reference range.

8. The vehicle sensor cleaning apparatus of claim 1, wherein the liquid controller is further configured to stop an operation of the washer pump motor when receiving an error signal from the washer pump motor.

9. A control method of a vehicle sensor cleaning apparatus connected to a vehicle controller of a vehicle, the control method comprising:

receiving a cleaning request signal from the vehicle controller; and controlling a liquid sprayer and an air sprayer to be alternately performed on at least one sensor located in a vehicle, wherein the liquid sprayer comprises:

a washer fluid tank configured to store washer fluid;

a washer pump motor configured to output the washer fluid stored in the washer fluid tank to a liquid distributor; and a plurality of nozzles configured to spray the washer fluid output from the liquid distributor toward a plurality of sensors, wherein a number of nozzles capable of simultaneously spraying the washer fluid is predefined, when second to N-th (wherein N is 3 or greater) cleaning request signals for second to N-th sensors of a same type are received while performing a cleaning operation corresponding to a first cleaning request signal for a first sensor, the controlling comprising:

determining priorities of the second to N-th cleaning request signals;

performing, within the number of nozzles capable of simultaneously spraying the washer fluid, cleaning operations corresponding to the cleaning request signals selected according to the priorities in an overlapping manner with the cleaning operation corresponding to the first cleaning request signal; and after completion of the cleaning operation corresponding to the first cleaning request signal, performing in an overlapping manner a cleaning operation corresponding to a cleaning request signal having a next priority.

10. The control method of claim 9, wherein the controlling comprises:

performing a control operation to spray washer fluid at at least one sensor; and spraying air when the washer fluid spraying is in an off state.

11. The control method of claim 9, wherein the controlling comprises:

upon receiving a cleaning request signal, outputting a motor control signal having a duty cycle to the washer pump motor for the washer fluid spraying; and when a cycle of the motor control signal is completed, controlling the nozzle, which sprays washer fluid, to be in an OFF state.

12. The control method of claim 9, wherein the controlling comprises:

determining a supply voltage supplied from the vehicle;

adjusting a duty cycle of a motor control signal of the washer pump motor for washer fluid spraying according to a difference between a predefined reference voltage and the supply voltage supplied from the vehicle.

13. A computer-readable recording medium having recorded thereon computer-readable program code that, when executed by the vehicle controller, causes the control method of claim 9 to be performed.

\* \* \* \* \*